United States Patent [19]

Teng

[11] Patent Number: 5,238,391
[45] Date of Patent: Aug. 24, 1993

[54] INJECTION MOLDING PROBE WITH COAXIAL THERMOCOUPLE TUBE AND HEATING ELEMENT

[75] Inventor: Alex C. Teng, 2 Tillplain Road, Downsview, Ontario, Canada, M3H 5R2

[73] Assignee: Alex C. Teng, Downsview, Canada

[21] Appl. No.: 837,155

[22] Filed: Feb. 19, 1992

[51] Int. Cl.⁵ .............................................. B29C 45/72
[52] U.S. Cl. .................................... 425/547; 29/611; 264/328.14; 264/328.15; 425/549
[58] Field of Search ................ 425/547, 548, 549; 264/328.14, 328.15; 29/611

[56] References Cited

U.S. PATENT DOCUMENTS

| | | | |
|---|---|---|---|
| 4,557,685 | 12/1985 | Gellert | 425/549 |
| 4,611,394 | 9/1985 | Gellert | 29/611 |
| 4,820,147 | 4/1989 | Gellert | 425/549 |
| 4,837,925 | 6/1989 | Gellert | 425/549 |

*Primary Examiner*—Tim Heitbrink
*Attorney, Agent, or Firm*—Dalesman & Company

[57] ABSTRACT

An injection molding probe with an elongated outer body has an electrical heating element wound in a helical coil around a central thermocouple tube integrally braze filled in silver in the body. A thermocouple bore extends through the tube into the silver adjacent the forward end of the body. This improves temperature control of the melt flowing around the probe and also facilitates manufacture.

6 Claims, 2 Drawing Sheets

INJECTION MOLDING PROBE WITH COAXIAL THERMOCOUPLE TUBE AND HEATING ELEMENT

BACKGROUND OF THE INVENTION

This invention relates generally to injection molding and more particularly to an improved injection molding probe.

Heated injection molding nozzles and probes are widely used to maintain pressurized melt at a uniform temperature as it flows towards a gate leading to a cavity. The difference between a nozzle and a probe is that the melt flows through a nozzle and around a probe. Previously, as seen in U.S. Pat. No. 4,820,147 to Gellert which issued Apr. 11, 1989 and Gellert Canadian patent application serial number 2,032,728-6 filed Dec. 19, 1990 entitled "Injection Molding Probe With Varying Heat Profile", probes had an electrical heating element which ran longitudinally in the outer body of the probe. However, they do show the heating element bent back upon itself in different sections to provide varying heat along the length of the probe to compensate for differences in heat loss due to the structure of the probe. U.S. Pat. No. 4,557,685 to Gellert which issued Dec. 10, 1985 shows a similar provision for nozzles by varying the pitch of the helical heating element which is wound around the outer surface of the nozzle body.

It is also well known to mount removable thermocouples in probes to monitor the operating temperature near the forward end of the probe. An early example is seen in U.S. Pat. No. 4,611,394 to Gellert which issued Sep. 16, 1986 and shows a thermocouple extending to the forward end of the probe through a sleeve extending longitudinally beside a central cartridge heater. More recently, Gellert U.S. Pat. No. 5,122,050 which issued Jun. 16, 1992 entitled "Injection Molding Probe With a Longitudinal Thermocouple Bore and Off Center Heating Element" shows shifting the heating element off center to accommodate a longitudinal thermocouple bore without unduly increasing the outer diameter of the body of the probe. All of these previous arrangements having both a longitudinal thermocouple bore and a heating element have the disadvantage that either one or both of them must be off center. Also in order to have sufficient strength, the outer diameter of the probe was increased to compensate for the distance provided between the thermocouple bore and the heating element.

SUMMARY OF THE INVENTION

Accordingly, it is an object of the present invention to at least partially overcome the disadvantages of the prior art by providing an injection molding probe having an electrical heating element and a longitudinal thermocouple bore which both extend centrally in the outer body of the probe.

To this end, in one of its aspects, the invention provides an integral injection molding probe having an elongated outer body with a rear end and a forward end, a longitudinal thermocouple bore extending in the outer body to receive a thermocouple to monitor the temperature adjacent the forward end of the outer body, and an electrically insulated heating element with a heating portion extending to a terminal adjacent the rear end of the outer body, the heating portion of the heating element extending in the outer body towards the forward end of the outer body, having the improvement wherein the thermocouple tube extends through a central sleeve extending longitudinally in the outer body of the probe, and the heating portion of the heating element is wound coaxially around the tube to form a helical coil.

Further objects and advantages of the invention will appear from the following description taken together with the accompanying drawings.

DETAILED DESCRIPTION OF THE DRAWINGS

Figure 1:
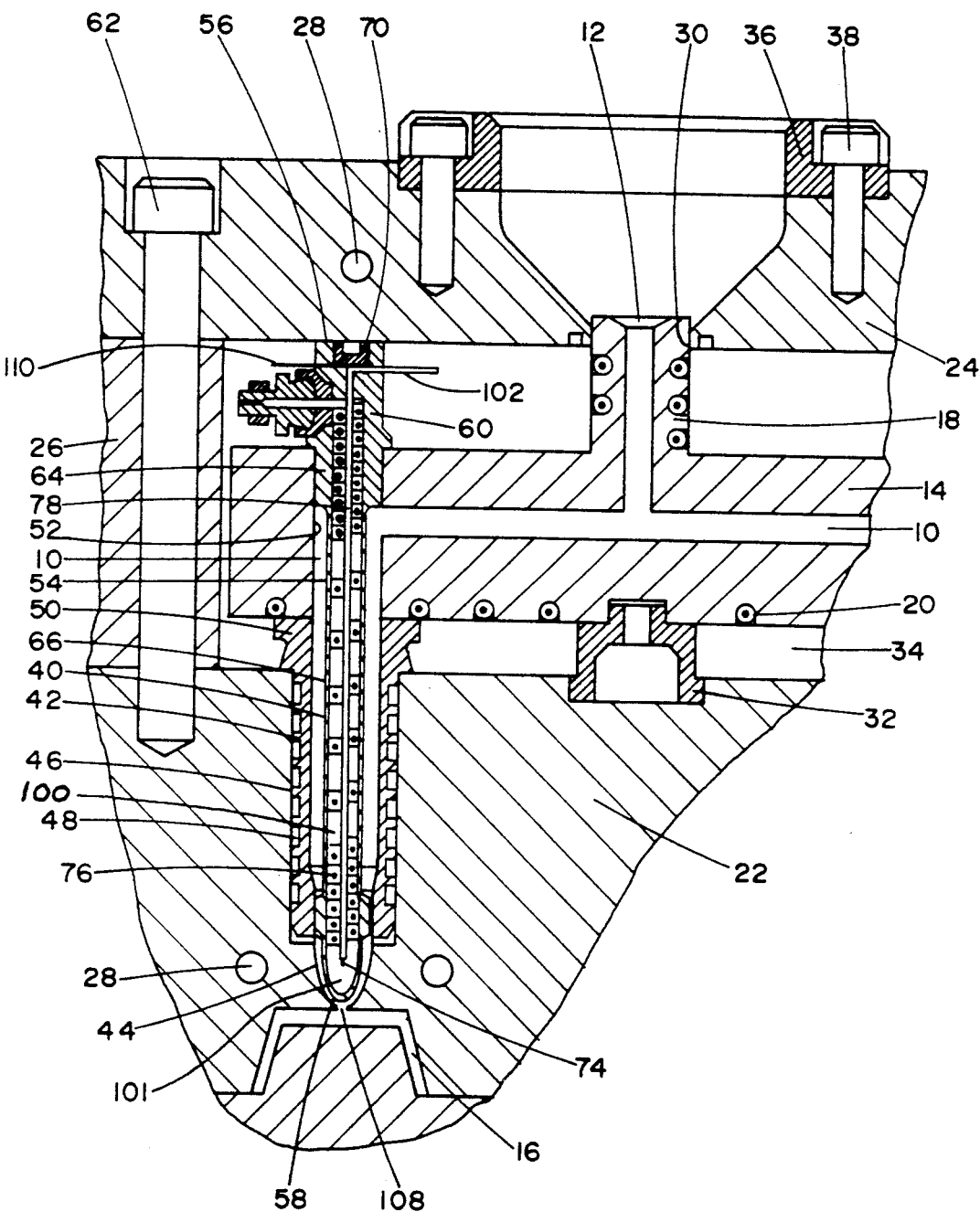
FIG. 1 is a sectional view of a portion of a multi-cavity injection molding system showing a probe according to a preferred embodiment of the invention.

Reference is first made to FIG. 1 which shows a portion of a hot tip gated multi-cavity injection molding system. A melt passage 10 branches from an inlet 12 in a heated melt distribution manifold 14 to convey pressurized melt to each cavity 16. The melt distribution manifold 14 has an integral heated inlet portion 18 and an electrical heating element 20 as described in Mold-Masters U.S. Pat. No. 5,142,126 which issued Aug. 25, 1992 entitled "Injection Molding Manifold With Integral Heated Inlet Portion." The manifold 14 extends between a cavity plate 22 and a back plate 24 which are separated by a spacer plate 26. These plates are cooled by pumping cooling water through cooling conduits 28. The manifold 14 is accurately centrally located in this position by the cylindrical inlet portion 18 extending through a matching opening 30 in the back plate 24 and by a central locating ring 32 which is seated between it and the cavity plate 22. As can be seen, this provides an insulative air space 34 between the heated manifold 14 and the surrounding cooled plates. A circular collar 36 is secured in a seat in the back plate 24 by bolts 38 and locates the mold in the molding machine.

The system has a number of heated probes 40 according to the invention which are made by the method described below. Each probe 40 extends through a sealing sleeve 42 and into a well 44 in the cavity plate 22. Each sealing sleeve 42 has a ridged outer surface 46 which provides insulative air grooves 48 between it and the surrounding cavity plate 22. Each sealing sleeve 42 also has a larger diameter rear collar portion 50 which extends between the manifold 14 and the cavity plate 22 to prevent leakage of pressurized melt from the melt passage 10 into the air space 34. The inner diameter of the sealing sleeve 42 is the same as the diameter of the adjacent bore 52 in the manifold 14 which is large enough to form the portion of the melt passage 10 which extends around the heated probe 40.

Each probe 40 has an elongated outer body 54 with a rear end 56 and a forward end 58. In this embodiment of the invention the forward end 58 has a pointed tip, but in other embodiments it may be made with a different shape suitable for other types of gating such as angle tip or hot edge gating. The outer body 54 of each probe 40 has a larger diameter rear cap portion 60 which extends between the manifold 14 and the back plate 24. The back plate 24 is secured in position by bolts 62 which extend through the spacer plate 26 into the cavity plate 22. The back plate 24 thus applies a force to the rear ends 56 of the probes 40 which holds the probes 40, manifold 14, and sealing sleeves 42 securely in position. The outer body 54 of each probe 40 also has an intermediate portion 64 extending between the larger diameter rear cap portion 60 and a smaller diameter forward portion 66. The intermediate portion 64 is just long enough to extend to the melt passage 10, and its diameter is just large enough to fit precisely in the matching bore 52 through the manifold 14 to prevent leakage of the pressurized melt between them. As described in the applicant's Canadian patent application serial number 2,037,186-2 mentioned above, the forward portion 66 of each probe 40 has four equally spaced fins 68 which project outwardly to contact the sealing sleeve 42 to accurately locate the probe 40 at the operating temperature. The melt flows between the fins 68 which are smoothly shaped to avoid any dead spots in the flowing melt. The rear end 56 of each probe 40 has a retaining plug 70 which is screwed into a threaded seat 72 in the cap portion 60 of the outer body 54 of the probe 40.

While the outer body 54 of the probe 40 is similar to previous probes, the probe 40 according to the invention has a novel central thermocouple bore or hole 74 and heating element 76 arrangement. The thermocouple bore 74 extends through a central stainless steel tube 78 which extends longitudinally in the outer body 54 of the probe 40. The electrical heating element 76 has a heating portion 80 which is wound coaxially around the central tube 78 to form a helical coil. The heating element 76 extends to a terminal 82 adjacent the rear end 56 of the outer body 54. The terminal 82 receives power from an external source through connecting lead 84. In this embodiment, the heating element 76 has a nickelchrome resistance wire 86 extending through a refractory powder 88 such as magnesium oxide in a steel casing 90. The electrical terminal 82 is made by the method described in U.S. Pat. No. 4,837,925 to Gellert which issued Jun. 13, 1989. A coating 92 of magnesium oxide or other suitable insulating material is applied between the steel terminal body 94 and a steel protective cap 96. A bared end 98 of the heating element 76 extends into the terminal 82 to be in electrical connection with the terminal body 94. The heating element 76 also has a bared forward end (not shown) which is grounded when the outer body 54 is braze filled with silver 100 or other suitable highly conductive material around the heating element 76 and the thermocouple tube 78 as described in more detail below. The helical heating portion 80 of the heating element 76 has a varying pitch along its length to compensate for differences in heat loss. As can be seen, the pitch is less near the areas where there is direct contact between the heated probe 40 and the surrounding manifold 14 or sealing sleeve 42. In this embodiment, the outer casing 90 of the helical heating portion 80 of the heating element 76 has been swaged to have a more rectangular cross-section to reduce its thickness. While it is shown rectangular for ease of illustration, in fact its corners are sufficiently rounded so there is a space between them to provide for a downward spiral flow of the silver during braze filling. In other embodiments, the outer casing 90 can be left round in situations where a reduction in size is not important.

The thermocouple bore 74 extends through the stainless steel tube 78 a short distance forwardly into a nipple 101 of silver which is formed adjacent the forward end 58 of the outer body 54 of the probe 40. A thermocouple wire 102 is removably inserted into the bore 74 and is bent outwardly through a groove 104 in a rim portion 106 of the threaded seat 72 in the cap portion 60 of the outer body 54 of the probe 40. When the threaded plug 70 is screwed into the threaded seat 72, it ensures the thermocouple is seated in the bore 74 which extends into the silver nipple 101 and retains it in that position. This provides for monitoring the temperature of the probe 40 in the area where the melt flows around it into the gate 108. This provides a more accurate indication of the melt temperature because the thermocouple is located in the center of the probe 40 and not offset to one side. The plug 70 also secures a ground wire 110 which extends inwardly through a radial hole 111 in the rim portion 106 of the seat 72. The threaded seat can also be used to receive a threaded tool to pull the probe 40 out of the bore 52 of the manifold 14 for repair or replacement if necessary.

Figure 2:
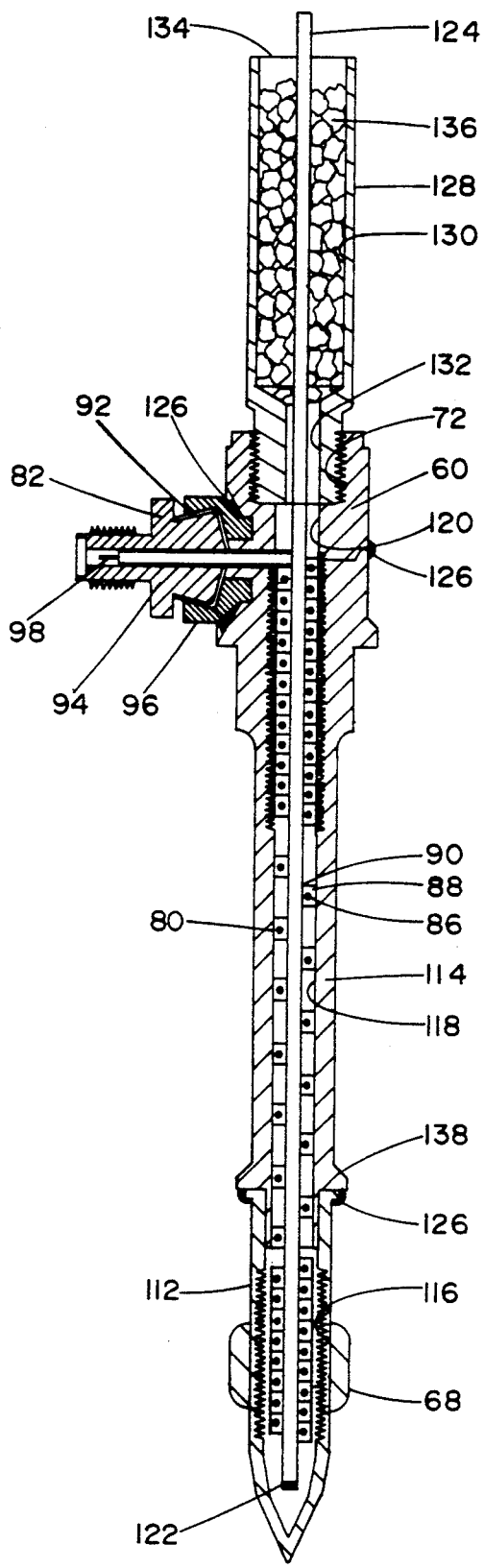
FIG. 2 is a sectional view showing how the probe is made.
Figure 3:
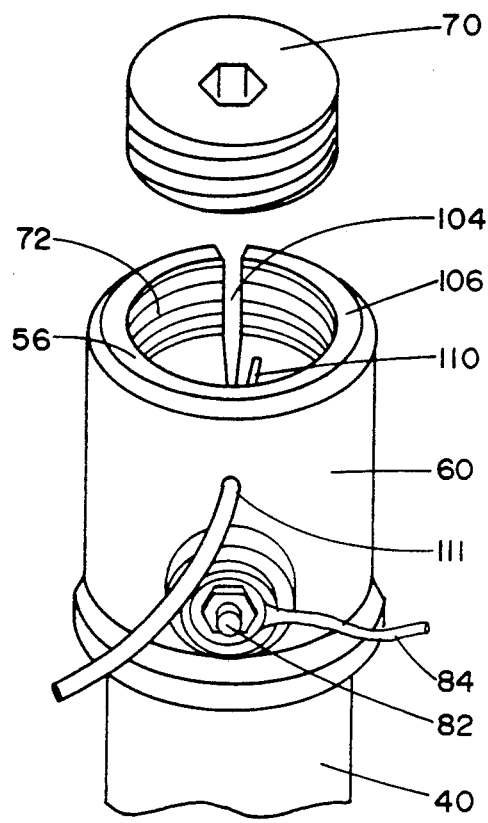
FIG. 3 is an isometric view showing the rear end of the probe.

Reference is now made to FIGS. 2 and 3 to describe the method of making the probe 40. The three components of the outer body 54 of the probe 40, the forward portion 112, the central sleeve portion 114, and the rear cap portion 60 are machined to the shape seen in FIG. 2. The hollow forward portion 112 is made of a high speed steel with a longitudinal bore 116 extending to a closed forward end which forms the pointed forward end 58 of the probe 40. The elongated central sleeve portion 114 is made of a hot work steel such as H13 with a central longitudinal bore 118. The rear cap portion 60 is also made of a hot work tool steel such as H13 with the rim portion 106 extending around the cylindrical threaded seat 72. The rear cap portion 60 also has a central bore 120 extending forwardly from the threaded seat 72. The central sleeve portion 114 and the rear cap portion 60 are shaped to receive the electrical terminal 82 described above when they are mounted together.

The heating portion 80 of the heating element 76 is swaged and wound in a helical coil around the steel thermocouple tube 78 which has a forward end 122 which is closed by a plug welded in it. As described above, the helical heating portion 80 of the heating element 76 is wound with a predetermined pitch which varies along its length to compensate for differences in heat loss. As seen in FIG. 2, the assembled heating element 76 and thermocouple tube 78 are then inserted centrally into the aligned bores 116, 118 of the forward portion 112 and central sleeve portion 114 of the outer body 54. The cap portion 60 is then mounted with the rear end 124 of the thermocouple tube 78 extending a considerable length through its central bore 120. The electrical terminal is then mounted over the bared end 98 of the heating element 76 and these components are tack welded together to hold them in place. A bead 126 of a suitable brazing material such as nickel alloy is applied along the joins between the three components 112, 114, 60 of the probe body 54 and the electrical terminal 82. A filler tube 128 is mounted over the projecting thermocouple tube 78 and screwed into the threaded seat 72 in the rear cap portion 60 of the probe body 54. The filler tube 128 has a hollow bore 130 with a smaller diameter square portion 132 adjacent the cap portion 60 which facilitates removal of the filler tube 128 after braze filling. As seen in FIG. 2, the rear end 124 of the thermocouple tube 78 extends above the open mouth 134 of the filler tube 128 through which a predetermined quantity of silver 136 is loaded into the hollow bore 130 of the filler tube 128.

The assembly is then inserted in the upright position shown into a vacuum furnace and first heated above the melting temperature of the brazing material and then above the melting temperature of the silver according to a predetermined cycle. As the furnace is gradually heated, it is evacuated to a relatively high vacuum to remove substantially all of the oxygen. Before the melting point of the nickel alloy brazing material is reached, the vacuum is reduced by partially backfilling with an inert gas such as argon or nitrogen. When the nickel alloy melts, it flows by capillary action to seal the joins between the various components. When the silver melts, it flows downwardly around the heating element 76 and thermocouple tube 78 to fill the aligned bores 116, 118, 120 of the three portions 112, 114, 60 of the probe body 54. This process of brazing and filling in a vacuum furnace which is referred to herein as braze filling provides a metallurgical bonding of the nickel alloy to the steel and of the silver to the heating element 76, thermocouple tube 78, and the surrounding probe body 54 to form a metallurgically monolithic integral heated probe 40. A nipple 101 of silver is formed around the forward end 122 of the thermocouple tube 78 adjacent the closed forward end 58 of the probe body 54.

After the probe 40 is cooled and removed from the vacuum furnace, the filler tube 128 is removed by unscrewing it from the threaded seat 72. The solidified silver in the square portion 132 of the bore 130 of the filler tube 128 breaks cleanly and the projecting portion of the thermocouple tube 78 is twisted off. The probe 40 is machined to remove the flanges 138 and to provide a precise predetermined outer shape and finish. The rim portion 106 around the threaded seat 72 in the rear cap portion 60 of the probe body 54 is machined to form the radial thermocouple groove 104 and the radial hole 111 to receive the ground wire 110. A thin drill is inserted through the hollow thermocouple tube 78 to open the closed forward end and extend the thermocouple bore 74 a predetermined distance into the nipple 101 of silver adjacent the pointed forward end 58 of the probe body 54. During installation, the thermocouple wire 102 is inserted as far as possible into the thermocouple bore 74 and then bent outwardly through the radial groove 104 in the rim portion 106. When the threaded plug 70 is screwed into the threaded seat 72 it ensures that the thermocouple is positioned all the way forward in the nipple 101 of silver and is securely retained there. The ground wire 110 is inserted in through the radial hole 111 and is also clamped in place when the plug 70 is tightened in the threaded seat 72.

In use, the injection molding system or apparatus is assembled as shown in FIG. 1. Electrical power is applied to the heating element 20 in the manifold 14 and the heating element 76 in each probe 40 to heat them to a predetermined operating temperature. Pressurized melt from a molding machine (not shown) is then injected into the melt passage 10 through the common inlet 12 in the manifold inlet portion 18 according to a predetermined cycle in a conventional manner. The pressurized melt flows along around each heated probe 40 and through the gates 108 to fill the cavities 16. After the cavities 16 are filled, injection pressure is held momentarily to pack and then released. After a short cooling period, the mold is opened to eject the molded products. After ejection, the mold is closed and injection pressure is reapplied to refill the cavities. This cycle is continuously repeated with a frequency dependent on the size and shape of the cavities and the type of material being molded. The central location of the heating portion 80 of the heating element 76 and the thermocouple bore 74 in the nipple 101 of silver improves temperature control of the melt flowing around the probe 40 to the gate 108. During injection, excess heat is produced by friction of the melt. However, this excess friction heat is removed by the silver to avoid stringing when the mold opens. At the same time, the thermocouple registers the excess heat and does not call for additional heat from the heating element. However, when the mold is opened for ejection, sufficient heat is provided to prevent the melt in the area of the gate 108 freezing to the extent of forming a solid plug which would interfere with injection when injection pressure is reapplied after the mold is closed. Thus, temperature control is achieved more quickly and cycle time is reduced.

Furthermore, this arrangement of winding the heating portion 80 of the heating element 76 coaxially around the thermocouple tube 78 has the advantage that it avoids either of them being off center in the probe. Therefor, more uniform heat is provided to the melt around the outside of the probe and the melt temperature can be monitored more accurately. Also, the distances the thermocouple bore 74 and the heating element 76 are spaced from the forward end 58 of the probe body 54 can be made different for different applications. Manufacture is facilitated considerably and the danger of damaging the heating element when it is bent back upon itself has been eliminated.

While the description of the integral heated probe 40 has been given with respect to a preferred embodiment, it will be evident that various modifications are possible without departing from the scope of the invention as understood by those skilled in the art and as defined in the following claims.

The embodiments of the invention in which an exclusive property or privilege is claimed are defined as follows:

1. In an integral injection molding probe having an elongated outer body with a rear end and a forward end, a longitudinal thermocouple bore extending in the outer body to receive a thermocouple to monitor the temperature adjacent the forward end of the outer body, and an electrically insulated heating element with a heating portion extending to a terminal adjacent the rear end of the outer body, the heating portion of the heating element extending in the outer body towards the forward end of the outer body, the improvement wherein:

the thermocouple bore extends through a central tube extending longitudinally in the outer body of the probe, and the heating portion of the heating element is wound coaxially around the tube to form a helical coil.

2. An injection molding probe as claimed in claim 1 wherein a highly conductive material is braze filled around the tube and helical heating portion of the heating element to provide the probe with a metallurgically monolithic structure.

3. An injection molding probe as claimed in claim 2 wherein the highly conductive material is silver.

4. An injection molding probe as claimed in claim 2 wherein the helical heating portion of the heating element has a predetermined varying pitch.

5. An injection molding probe as claimed in claim 4 wherein the heating element has a forward end near the forward end of the outer body of the probe.

6. An injection molding probe as claimed in claim 5 wherein the thermocouple bore extends through the central tube a predetermined distance forwardly into the highly conductive material adjacent the forward end of the outer body of the probe.

* * * * *